United States Patent
Yach

(10) Patent No.: US 7,988,037 B2
(45) Date of Patent: Aug. 2, 2011

(54) DEVICE AND METHOD FOR CONTACT INFORMATION EXCHANGE

(75) Inventor: David Paul Yach, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

(21) Appl. No.: 12/610,445

(22) Filed: Nov. 2, 2009

(65) Prior Publication Data

US 2011/0101086 A1    May 5, 2011

(51) Int. Cl.
  *G06F 17/00* (2006.01)
  *G06K 7/10* (2006.01)
(52) U.S. Cl. .......... 235/375; 235/435; 235/462.01; 235/472.01
(58) Field of Classification Search .......... 235/375, 235/462.01–462.49; 379/910
  See application file for complete search history.

(56) References Cited

U.S. PATENT DOCUMENTS

| | | | |
|---|---|---|---|
| 6,963,845 B1 | 11/2005 | Lapstun et al. | |
| 7,159,770 B2 | 1/2007 | Onozu | |
| 7,221,910 B2* | 5/2007 | Ishii et al. | 455/41.2 |
| 7,337,971 B2 | 3/2008 | Melick et al. | |
| 7,419,097 B2 | 9/2008 | Lee | |
| 2005/0143126 A1* | 6/2005 | Chipchase | 455/557 |
| 2006/0056707 A1 | 3/2006 | Suomela | |
| 2006/0123041 A1 | 6/2006 | Sandrini et al. | |
| 2007/0129959 A1* | 6/2007 | Bransky et al. | 705/1 |
| 2007/0189579 A1 | 8/2007 | Crookham et al. | |
| 2008/0041929 A1* | 2/2008 | Bauman et al. | 235/375 |
| 2009/0021796 A1* | 1/2009 | Bloomfield | 358/402 |
| 2009/0212113 A1* | 8/2009 | Chiu et al. | 235/462.41 |
| 2010/0012715 A1* | 1/2010 | Williams et al. | 235/375 |

OTHER PUBLICATIONS

Extended European Search Report dated Apr. 14, 2010.
www.youtube.com/watch?v=crPg_eyXPTs&NR=1.
www.youtube.com/watch?v=ihdn8XDWebE&feature=related.
www.youtube.com/watch?v=6ZellRp6sm8.
www.youtube.com/watch?v=uf_DNHPBV-s&NR=1.
David Harper's Different Things, "http://harper.wirelessink.com/2006/03/29/mainstream-america-is-read-for-bar-codes-converging-realspace-and-mobilespace/", Mar. 29, 2006.
Stephan Constantinescu, Nokia Barcode and Business Card Reader: Taking the definition of a platform and throwing it out the window!, IntoMobile, "http://www.intomobile.com/2007/01/20/nokia-barcode-and-business-card-reader-taking-the-definition-of-a-platform-and-throwing-it-out-the-window", Jan. 20, 2007.
Edward C. Baig, Expense receipt overload? NeatDesk can help, USA Today, Nov. 6, 2008.
Edward C. Baig, NeatDesk helps tidy up receipt piles and such, USA Today, Nov. 6, 2008.

* cited by examiner

*Primary Examiner* — Michael G Lee
*Assistant Examiner* — Laura Gudorf
(74) *Attorney, Agent, or Firm* — Rowand Intellectual Property Law

(57) ABSTRACT

A method and device exchanging contact information on an electronic device. Contact information is obtained from a contact by scanning a barcode using an electronic device and decoding the barcode to recover the contact information encoded therein. The contact information may be used to reciprocate by sending user contact data in a message addressed to an electronic address obtained from the contact information. The user contact data may be encoded in a second barcode displayed on the electronic device.

18 Claims, 9 Drawing Sheets

DEVICE AND METHOD FOR CONTACT INFORMATION EXCHANGE

FIELD

The present application relates to contact information management and, more particularly, to devices and methods for the short-range exchange of contact information.

BACKGROUND

Traditionally, contact information has been exchanged between parties through the use of business cards. Business cards often include contact information such as, for example, street addresses, telephone number(s), fax number, e-mail addresses and website addresses.

Traditional business cards suffer from numerous disadvantages. In particular, traditional business cards may be lost and easily destroyed or damaged.

Accordingly, there exists a need for improved methods and systems for exchanging contact information.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
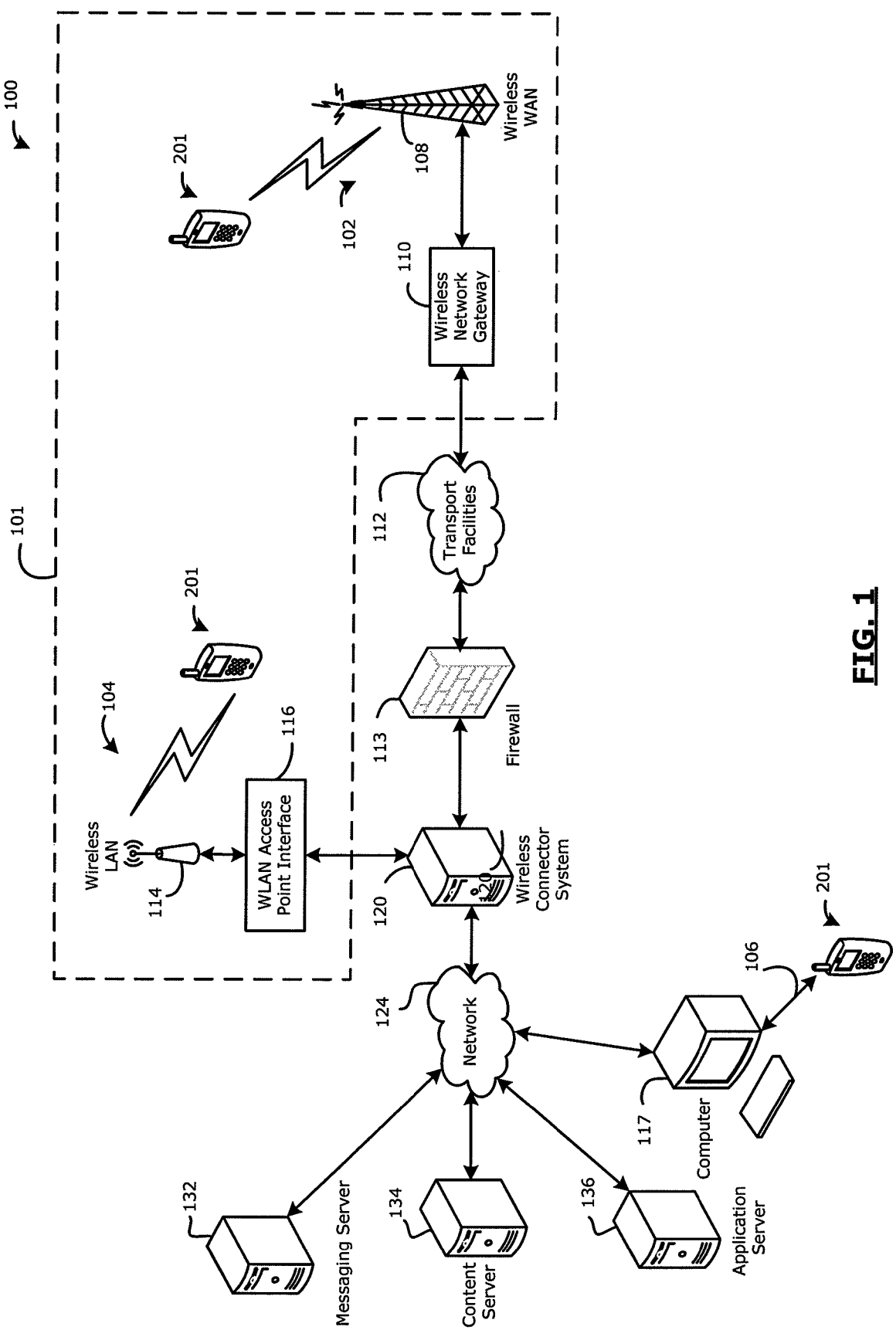
FIG. 1 shows a block diagram illustrating a communication system including a mobile communication device to which example embodiments of the present disclosure can be applied.

In one aspect, the present application provides method of exchanging contact information using an electronic handheld device, the electronic handheld device having a camera and a memory storing user contact data. The method includes obtaining, with the camera, an image of a barcode associated with a contact, the barcode having contact information encoded therein; decoding the barcode to obtain the contact information; obtaining an electronic address associated with the contact from the contact information; and automatically transmitting the user contact data to the electronic address obtained from the contact information.

In another aspect, the present application provides an electronic device. The electronic device comprises a display; a camera; memory storing user contact data; a processor; and a code reader application executable by the processor. The code reader application includes instructions for configuring the camera to obtain an image of a barcode associated with a contact, the barcode having contact information encoded therein, and instructions to configure the processor to decode the barcode to obtain the contact information, obtain an electronic address associated with the contact from the contact information, and automatically transmit the user contact data to the electronic address obtained from the contact information.

In yet a further aspect, the present application provides computer readable program product including a computer readable storage medium having encoded thereon computer executable instructions for exchanging contact information using an electronic handheld device, the electronic handheld device having a camera and a memory storing user contact data. The computer executable instructions include instructions for obtaining, with the camera, an image of a barcode associated with a contact, the barcode having contact information encoded therein; instructions for decoding the barcode to obtain the contact information; instructions for obtaining an electronic address associated with the contact from the contact information; and instructions for automatically transmitting the user contact data to the electronic address obtained from the contact information.

In yet another aspect, the present application provides method of mutually exchanging contact information between a first electronic handheld device and a second electronic handheld device, each of the electronic handheld devices having a camera and a memory. The method includes displaying on the first electronic handheld device a first barcode encoding first contact information associated with the first electronic handheld device; obtaining, with the camera of the second electronic handheld device, an image of the first barcode; decoding the first barcode to obtain the first contact information; displaying on the second electronic handheld device a second barcode encoding second contact information associated with the second electronic handheld device; obtaining, with the camera of the first electronic handheld device, an image of the second barcode; decoding the second barcode to obtain the second contact information; and storing the first and second contact information within memory on the second and first electronic devices, respectively.

Other aspects of the present application will be apparent to those of ordinary skill in the art from a review of the following detailed description in conjunction with the drawings.

Embodiments of the present application are not limited to any particular operating system, mobile device architecture, server architecture, or computer programming language.

In order to facilitate an understanding of one possible environment in which example embodiments described herein can operate, reference is first made to FIG. 1 which shows in block diagram form a communication system 100 in which example embodiments of the present disclosure can be applied. The communication system 100 comprises a number of mobile communication devices 201 which may be connected to the remainder of the system 100 in any of several different ways. Accordingly, several instances of mobile communication devices 201 are depicted in FIG. 1 employing different example ways of connecting to system 100. Mobile communication devices 201 are connected to a wireless network 101 which may comprise one or more of a Wireless Wide Area Network (WWAN) 102 and a Wireless Local Area Network (WLAN) 104 or other suitable network arrangements. In some embodiments, the mobile communication devices 201 are configured to communicate over both the WWAN 102 and WLAN 104, and to roam between these networks. In some embodiments, the wireless network 101 may comprise multiple WWANs 102 and WLANs 104.

The WWAN 102 may be implemented as any suitable wireless access network technology. By way of example, but not limitation, the WWAN 102 may be implemented as a wireless network that includes a number of transceiver base stations 108 (one of which is shown in FIG. 1) where each of the base stations 108 provides wireless Radio Frequency (RF) coverage to a corresponding area or cell. The WWAN 102 is typically operated by a mobile network service provider that provides subscription packages to users of the mobile communication devices 201. In some embodiments, the WWAN 102 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSPDA (High-Speed Downlink Packet Access), IEEE 802.16e (also referred to as Worldwide Interoperability for Microwave Access or "WiMAX), or various other networks. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

The WWAN 102 may further comprise a wireless network gateway 110 which connects the mobile communication devices 201 to transport facilities 112, and through the transport facilities 112 to a wireless connector system 120. Transport facilities may include one or more private networks or lines, the public Internet, a virtual private network, or any other suitable network. The wireless connector system 120 may be operated, for example, by an organization or enterprise such as a corporation, university, or governmental department, which allows access to a network 124 such as an internal or enterprise network and its resources, or the wireless connector system 120 may be operated by a mobile network provider. In some embodiments, the network 124 may be realized using the Internet rather than an internal or enterprise network.

The wireless network gateway 110 provides an interface between the wireless connector system 120 and the WWAN 102, which facilitates communication between the mobile communication devices 201 and other devices (not shown) connected, directly or indirectly, to the WWAN 102. Accordingly, communications sent via the mobile communication devices 201 are transported via the WWAN 102 and the wireless network gateway 110 through transport facilities 112 to the wireless connector system 120. Communications sent from the wireless connector system 120 are received by the wireless network gateway 110 and transported via the WWAN 102 to the mobile communication devices 201.

The WLAN 104 comprises a wireless network which, in some embodiments, conforms to IEEE 802.11x standards (sometimes referred to as Wi-Fi) such as, for example, the IEEE 802.11a, 802.11b and/or 802.11g standard. Other communication protocols may be used for the WLAN 104 in other embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 may be a personal network of the user, an enterprise network, or a hotspot offered by an Internet service provider (ISP), a mobile network provider, or a property owner in a public or semi-public area, for example. The access points 114 are connected to an access point (AP) interface 116 which may connect to the wireless connector system 120 directly (for example, if the access point 114 is part of an enterprise WLAN 104 in which the wireless connector system 120 resides), or indirectly via the transport facilities 112 if the access point 14 is a personal Wi-Fi network or Wi-Fi hotspot (in which case a mechanism for securely connecting to the wireless connector system 120, such as a virtual private network (VPN), may be used). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email communications, to and from a set of managed mobile communication devices 201. The wireless connector system 120 also provides administrative control and management capabilities over users and mobile communication devices 201 which may connect to the wireless connector system 120.

The wireless connector system 120 allows the mobile communication devices 201 to access the network 124 and connected resources and services such as a messaging server 132 (for example, a Microsoft Exchange™, IBM Lotus Domino™, or Novell GroupWise™ email server), and a content server 134 for providing content such as Internet content or content from an organization's internal servers, and application servers 136 for implementing server-based applications such as instant messaging (IM) applications to mobile communication devices 201.

The wireless connector system 120 typically provides a secure exchange of data (e.g., email messages, personal information manager (PIM) data, and IM data) with the mobile communication devices 201. In some embodiments, communications between the wireless connector system 120 and the mobile communication devices 201 are encrypted. In some embodiments, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data. In some embodiments, the private encryption key is stored only in the user's mailbox on the messaging server 132 and on the mobile communication device 201, and can typically be regenerated by the user on mobile communication devices 201. Data sent to the mobile communication devices 201 is encrypted by the wireless connector system 120 using the private encryption key retrieved from the user's mailbox. The encrypted data, when received on the mobile communication devices 201, is decrypted using the private encryption key stored in memory. Similarly, data sent to the wireless connector system 120 from the mobile communication devices 201 is encrypted using the private encryption key stored in the memory of the mobile communication device 201. The encrypted data, when received on the wireless connector system 120, is decrypted using the private encryption key retrieved from the user's mailbox.

The wireless network gateway 110 is adapted to send data packets received from the mobile communication device 201 over the WWAN 102 to the wireless connector system 120. The wireless connector system 120 then sends the data packets to the appropriate connection point such as the messaging server 132, content server 134 or application servers 136. Conversely, the wireless connector system 120 sends data packets received, for example, from the messaging server 132, content server 134 or application servers 136 to the wireless network gateway 110 which then transmit the data packets to the destination mobile communication device 201. The AP interfaces 116 of the WLAN 104 provide similar sending functions between the mobile communication device 201, the wireless connector system 120 and network connection point such as the messaging server 132, content server 134 and application server 136.

The network 124 may comprise a private local area network, metropolitan area network, wide area network, the public Internet or combinations thereof and may include virtual networks constructed using any of these, alone, or in combination.

A mobile communication device 201 may alternatively connect to the wireless connector system 120 using a computer 117, such as desktop or notebook computer, via the network 124. A link 106 may be provided for exchanging information between the mobile communication device 201 and computer 117 connected to the wireless connector system 120. The link 106 may comprise one or both of a physical interface and short-range wireless communication interface. The physical interface may comprise one or combinations of an Ethernet connection, Universal Serial Bus (USB) connection, Firewire™ (also known as an IEEE 1394 interface) connection, or other serial data connection, via respective ports or interfaces of the mobile communication device 201 and computer 117. The short-range wireless communication interface may be a personal area network (PAN) interface. A personal area network is a wireless point-to-point connection meaning no physical cables are required to connect the two end points. The short-range wireless communication interface may comprise one or a combination of an infrared (IR) connection such as an Infrared Data Association (IrDA) connection, a short-range radio frequency (RF) connection such as one specified by IEEE 802.15.1 or the Bluetooth™ special interest group, or IEEE 802.15.3a, also referred to as Ultra-Wideband (UWB), or other PAN connection.

It will be appreciated that the above-described communication system is provided for the purpose of illustration only, and that the above-described communication system comprises one possible communication network configuration of a multitude of possible configurations for use with the mobile communication devices 201. The teachings of the present disclosure may be employed in connection with other types of networks and associated devices that are effective in implementing or facilitating wireless communication. Suitable variations of the communication system will be understood to a person of skill in the art and are intended to fall within the scope of the present disclosure.

Figure 2:
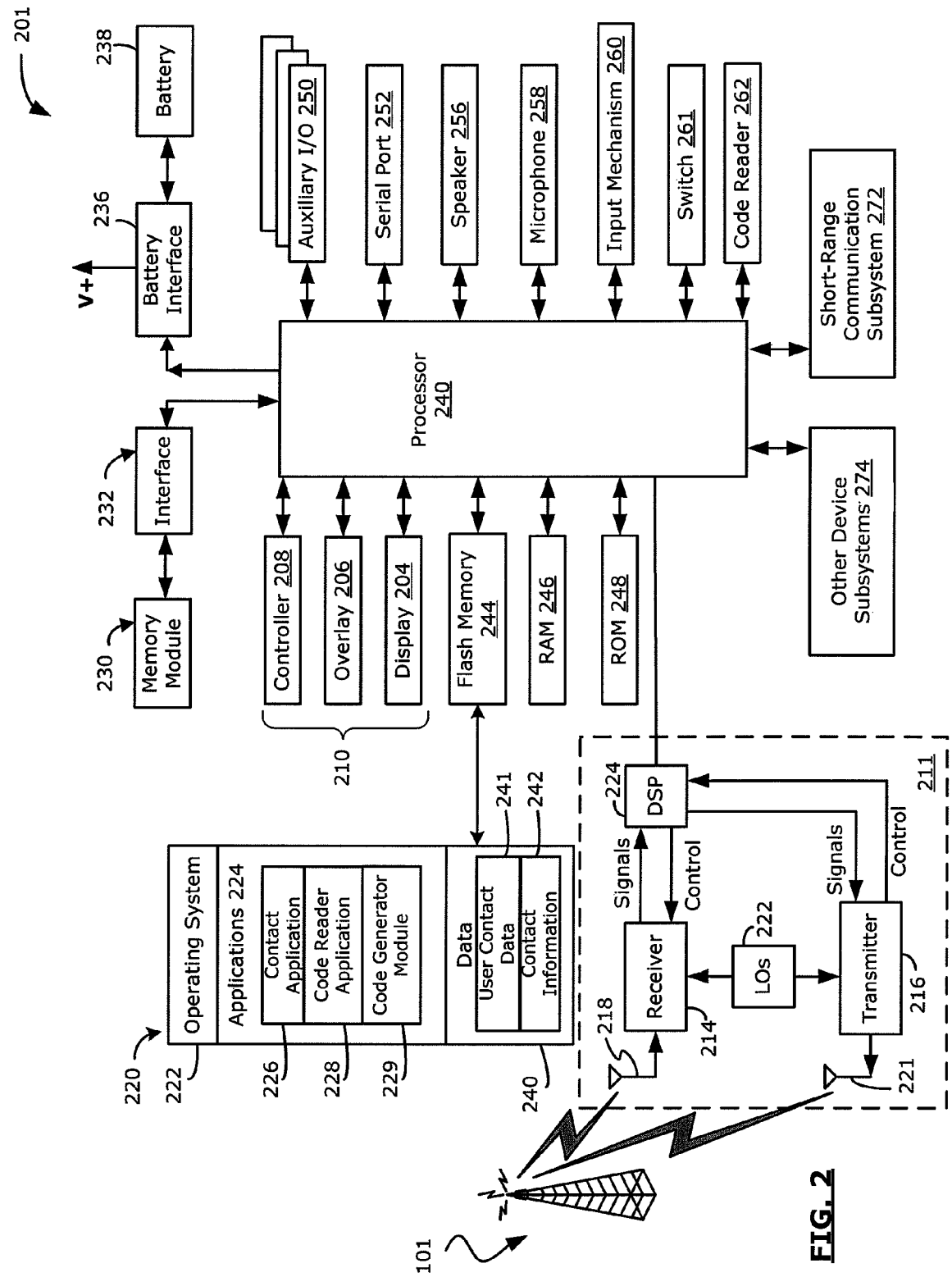
FIG. 2 is a block diagram illustrating a mobile communication device in accordance with one example embodiment of the present disclosure.

Reference is now made to FIG. 2 which illustrates a mobile communication device 201 in which example embodiments described in the present disclosure can be applied. The mobile communication device 201 is a two-way communication device having at least data and possibly also voice communication capabilities, and the capability to communicate with other computer systems, for example, via the Internet. Depending on the functionality provided by the mobile communication device 201, in various embodiments the device may be a data communication device, a multiple-mode communication device configured for both data and voice communication, a smartphone, a mobile telephone or a PDA (personal digital assistant) enabled for wireless communication, or a computer system with a wireless modem.

The mobile communication device 201 includes a controller comprising at least one processor 240 such as a microprocessor which controls the overall operation of the mobile communication device 201, and a wireless communication subsystem 211 for exchanging radio frequency signals with the wireless network 101. The processor 240 interacts with the communication subsystem 211 which performs communication functions. The processor 240 interacts with additional device subsystems. In some embodiments, the device 201 may include a touchscreen display 210 which includes a display (screen) 204, such as a liquid crystal display (LCD) screen, with a touch-sensitive input surface or overlay 206 connected to an electronic controller 208. The touch-sensitive overlay 206 and the electronic controller 208 provide a touch-sensitive input device and the processor 240 interacts with the touch-sensitive overlay 206 via the electronic controller 208. In other embodiments, the display 204 may not be a touchscreen display. Instead, the device 201 may simply include a non-touch display and one or more input mechanisms, such as, for example, a depressible scroll wheel.

The processor 240 interacts with additional device subsystems including flash memory 244, random access memory (RAM) 246, read only memory (ROM) 248, auxiliary input/output (I/O) subsystems 250, a data port 252 such as a serial data port, for example a Universal Serial Bus (USB) data port, a speaker 256, a microphone 258, an input mechanism 260, a switch 261, a code reader 262 (discussed in detail below), a short-range communication subsystem 272, and other device subsystems generally designated as 274. Some of the subsystems shown in FIG. 2 perform communication-related functions, whereas other subsystems may provide "resident" or on-device functions.

The communication subsystem 211 includes a receiver 214, a transmitter 216, and associated components, such as one or more antenna elements 218 and 221, local oscillators (LOs) 222, and a processing module such as a digital signal processor (DSP) 224. The antenna elements 218 and 221 may be embedded or internal to the mobile communication device 201 and a single antenna may be shared by both receiver and transmitter, as is known in the art. As will be apparent to those skilled in the field of communication, the particular design of the communication subsystem 211 depends on the wireless network 101 in which the mobile communication device 201 is intended to operate.

The mobile communication device 201 may communicate with any one of a plurality of fixed transceiver base stations 108 (FIG. 1) of the wireless network 101 within its geographic coverage area. The mobile communication device 201 may send and receive communication signals over the wireless network 101 after a network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 224. In a similar manner, signals to be transmitted are processed, including modulation and encoding, for example, by the DSP 224. These DSP-processed signals are input to the transmitter 216 for digital-to-analog (D/A) conversion, frequency up conversion, filtering, amplification, and transmission to the wireless network 101 via the antenna 221. The DSP 224 not only processes communication signals, but may also provide for receiver and transmitter control. For example, the gains applied to communication signals in the receiver 214 and the transmitter 216 may be adaptively controlled through automatic gain control algorithms implemented in the DSP 224.

The processor 240 operates under stored program control and executes software modules 220 stored in memory such as persistent memory, for example, in the flash memory 244. As illustrated in FIG. 2, the software modules 220 include operating system software 222 and software applications 224. The software applications 224 may include a contact information management application 226 for managing contact information 242 and a code reader application 228 for detecting and decoding encoded information obtained via the code reader 262.

In the present embodiment, the code reader 262 is a digital camera which takes video or still photographs or both by recording images using an electronic image sensor. The electronic image sensor may be a charge-coupled device (CCD) or complementary metal oxide semiconductor (CMOS) active pixel sensor. In embodiments in which the code reader 262 is a digital camera, the code reader application 228 may be a module in a camera application which is configured to obtain (or capture) digital images using the electronic image sensor. Light incident on the electronic image sensor is converted to image data by the code reader 262.

In other embodiments, other types of code readers 262 may be used. For example, in some embodiments, the code reader may include a light source and a sensor for measuring the intensity of the light reflected back from the light source. In other embodiments, the code reader may be a charge-coupled device (CCD) reader which measures ambient light from a barcode.

As will be described in greater detail below, the code reader 262 and code reader application 228 are configured to obtain an image in which data is encoded and to decode the image to obtain the data. More specifically, in the present example embodiments the image contains a barcode in which the data is encoded. In some example embodiments, the barcode may be a Universal Product Code (UPC) such as a UPC-A or UPC-E code, a European Article Number code such as EAN-8 or EAN-13, a Code 39 code, a Code 128 code, a Quick Response (QR) Code, a Data Matrix, or an Interleaved 2-of-5 (ITF) code. Those ordinarily skilled in the art will appreciate the range of barcodes and barcode-like images for encoding data that may be used in the context of the present application. Although the present application describes embodiments in which a barcode is used to encode contact information, the application is not limited to barcodes and includes other non-textual images in which data may be encoded. It will also be understood that the term "barcode" used herein is not limited to 1D linear barcodes, but is intended to include other symbologies, such as 2D barcodes, color codes, etc.

The code reader 262, under control of the code reader application 228, obtains the image containing the encoded information. In one embodiment, the code reader 262 captures the image and stores it in memory, for example, as a JPEG image, or in another format. The code reader application 228 is configured to analyze the stored image to detect a barcode within the image (if any), and decode the detected barcode.

In another embodiment, the code reader 262 does not capture an image and later analyze the image, but rather it operates in a "viewfinder mode" in which the incident light received by the CCD is converted to image data and displayed on the display in near-real-time, and the code reader application 228 analyzes the image data as the user manipulates the device 201 to bring the barcode within the field of view of the code reader 262. Once the code reader application 228 detects, i.e. recognizes, that a barcode is present in the field of view, then it causes the code reader 262 to obtain the image and the code reader application 228 decodes the barcode within the image. This may be referred to as a barcode scanning mode of operation for the code reader 262.

Those ordinarily skilled in the art will understand the processes for recognizing/detecting a barcode. Most barcodes are associated with a standard or other specification that details how the barcode is to be detected by a reader. For example, a 1D linear barcode typically includes start and stop markers. A 2D barcode, such as Data Matrix, includes a "finder pattern". In Data Matrix, the finder pattern is the border pattern of black and white "L"s. In a QR code, the finder pattern includes position symbols at three of the corners and an alignment symbol. The code reader application 228 may be configured to recognize one or more types of barcode based on their respective standards/specifications.

In accordance with an aspect of the present application, the barcode encodes business contact information, such as the information typically found on a personal business card. In one example embodiment, the barcode may be printed on a paper business card, for example on the back of the card. In another example embodiment, as will be described further below, the barcode may be displayed on the display screen of a mobile device and may encode the personal business contact information of the mobile device user. The code reader 262 in a receiving mobile device may be used to obtain the barcode from the display screen of the other mobile device. The code reader application 228 decodes the barcode to obtain the business contact information encoded therein.

The contact information encoded within the barcode may include the personal details of the business contact from whom the barcode was obtained. For example, it may include the contact's name, phone number, title, associated company, email address, mailing address, or other details. In some examples, it may include a logo, such as a company logo, or a photograph of the contact; although it will be appreciated that many barcodes lack sufficient capacity to encode photographs or images such as logos. In some example embodiments, the contact information encoded within the barcode may include a URL or other remote address. The URL or other address may be in addition to, or as an alternative to, business contact details. The code reader application 228 is configured to download additional information from a remote server accessed via the URL or other remote address. The additional information may include additional contact details or data, such as a photograph or layout/stylesheet data.

It will be appreciated from the foregoing description that the code reader 262 and code reader application 228 permit a mobile device user to easily obtain contact information for a business contact. The contact information is obtained through a short-range exchange which permits visual identification and verification of the person from whom the contact information is obtained. Additionally, the contact information is received in an electronic form, which avoids the necessity of inputting information from a printed business card to the mobile communications device 201. The mobile communications device 201 may be configured to perform a number of other functions once it has obtained the contact information, as briefly outlined below.

In some embodiments, the code reader application 228 may provide the contact information to the contact information management application 226 and the contact information may be added to contact information 242 stored in the memory of the device 201.

In some embodiments, the code reader application 228 may be configured to display the contact information on the display 210 of the device 201. In some cases, the code reader application 228 may be configured to display the contact information in a predetermined format; for example in a format that appears similar to a business card layout. In yet other cases, the information encoded within the barcode may include format or layout data that specifies the manner in which the contact information is to be displayed. In yet further cases, the layout data may be obtained from a URL or remote address specified in the contact information; for example, in the form of a stylesheet.

In some embodiments, the contact information management application 226 or the code reader application 228 may be configured to transmit at least some portion of a user's contact data 241 to an address specified in the contact information.

In some embodiments, the mobile device 201 may be configured to encode at least some portion of the user's contact data 241 and to display the encoded user's contact data as a barcode on the display 204 of the mobile device 201. In other words, after obtaining the contact information from the business contact, the user reciprocates by displaying his or her own barcode encoding his or her own contact information. The business contact may then obtain the user's contact data 241 by obtaining and decoding the barcode displayed on the user's mobile communications device 201. It will be appreciated that the mobile device 201 may permit the user to display his or her barcoded contact information prior to receiving any contact information from the business contact, so as to enable the user to initiate the exchange of contact information.

The mobile device 201 may include a code generator module 229 for creating a barcode encoding at least some user contact data 241. For example, the code generator module 229 may be configured to generate a barcode such as a Quick Response ("QR") code based on at least some of the user contact data 241 for the user. In some embodiments, the barcode may also have other data encoded therein such as, for example, communication preferences for the user. The communication preferences may specify one or more preferred methods of communication for the user and may contain a flag specifying whether the user prefers to automatically receive a contact's contact information after that contact has obtained and decoded the user's two dimensional bar code. In at least some embodiments, the code generator module 229 may be configured to display the two dimensional bar code on the display 204 in order to permit another device to read the two dimensional bar code and extract the information contained therein.

Those skilled in the art will appreciate that the software modules 220 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

The software applications 224 may include a range of other applications, including, for example, a messaging application, a calendar application, and/or a notepad application. In some embodiments, the software applications 224 include an email message application, a push content viewing application, a voice communication (i.e. telephony) application, a map application, and a media player application. Each of the software applications 224 may include layout information defining the placement of particular fields and graphic elements (e.g. text fields, input fields, icons, etc.) in the user interface (i.e. the display device 204) according to the application.

In some embodiments, the auxiliary input/output (I/O) subsystems 250 may comprise an external communication link or interface, for example, an Ethernet connection. The mobile communication device 201 may comprise other wireless communication interfaces for communicating with other types of wireless networks, for example, a wireless network such as an orthogonal frequency division multiplexed (OFDM) network or a GPS transceiver for communicating with a GPS satellite network (not shown). The auxiliary I/O subsystems 250 may comprise a vibrator for providing vibratory notifications in response to various events on the mobile communication device 201 such as receipt of an electronic communication or incoming phone call, or for other purposes such as haptic feedback (touch feedback).

In some embodiments, the mobile communication device 201 also includes a removable memory card 230 (typically comprising flash memory) and a memory card interface 232. Network access may be associated with a subscriber or user of the mobile communication device 201 via the memory card 230, which may be a Subscriber Identity Module (SIM) card for use in a GSM network or other type of memory card for use in the relevant wireless network type. The memory card 230 is inserted in or connected to the memory card interface 232 of the mobile communication device 201 in order to operate in conjunction with the wireless network 101.

The mobile communication device 201 stores data 240 in an erasable persistent memory, which in one example embodiment is the flash memory 244. In various embodiments, the data 240 includes service data comprising information required by the mobile communication device 201 to establish and maintain communication with the wireless network 101. The data 240 may also include user application data such as email messages, address book and contact information, calendar and schedule information, notepad documents, image files, and other commonly stored user information stored on the mobile communication device 201 by its user, and other data. The data 240 stored in the persistent memory (e.g. flash memory 244) of the mobile communication device 201 may be organized, at least partially, into a number of databases each containing data items of the same data type or associated with the same application. For example, email messages, contact records, and task items may be stored in individual databases within the device memory.

In some embodiments, the data 240 includes contact information 242 associated with a plurality of contacts. Contacts may include individuals and/or businesses, such as persons or businesses associated with one or more of the mobile device's users. By way of example and not limitation, the contact information 242 may include a name of a person or business, one or more telephone numbers associated with the person or business, such as, for example, a business telephone number, a home telephone number, a mobile telephone number and/or a fax telephone number. The contact information 242 may also include the contact's job title, company, extension number, nickname, email address, mailing address, web page address, instant messaging address, a name of a spouse or significant other, and/or a Personal Identification Number ("PIN") associated with an electronic device associated with the contact which may be used to send an electronic message to that contact. It will be appreciated that the contact information 242 associated with each contact may contain more or less information than the information listed above. In some cases, each type of contact information specified above may contain multiple entries. For example, a contact may have more than one email address. The contact information 242 may also include a company logo or a photograph of the individual, or both.

The data 240 may also include user contact data 241 associated with a user of the mobile device 201 or associated with a business related to the mobile device 201 or its user. The user contact data 241 may include the same types of information that may be included in the contact information 242 associated with contacts. That is, it may include one or more of the following: a name of the user of the mobile device 201, the name of a business associated with the mobile device 201 or its user, one or more telephone numbers associated with the user of the mobile device 201 or a business associated with the mobile device 201 or its user, such as, for example, a business telephone number, a home telephone number, a mobile telephone number and/or a fax telephone number, the user's job title, extension number, nickname, one or more email addresses associated with the user or company, one or more mailing addresses associated with the user or the company, web page address, instant messaging address, a name of a spouse or significant other, and/or a PIN associated with the mobile device 201 associated with the user which may be used to send an electronic message to that user. It will be appreciated that the user contact data 241 may contain more or less contact information than that listed above.

The PIN may be a unique identifier assigned to the mobile communication device 201 during manufacturing of that device 201. The PIN may, in some embodiments, act as an address for communicating with the mobile device 201. That is, messages sent to a PIN will be received at the device 201 associated with that PIN. The PIN may be saved in non-volatile memory so that the device will retain the PIN even when it is powered off.

The serial data port 252 may be used for synchronization with a user's host computer system (not shown). The serial data port 252 enables a user to set preferences through an external device or software application and extends the capabilities of the mobile communication device 201 by providing for information or software downloads to the mobile communication device 201 other than through the wireless network 101. The alternate download path may, for example, be used to load an encryption key onto the mobile communication device 201 through a direct, reliable and trusted connection to thereby provide secure device communication.

In some embodiments, the mobile communication device 201 is provided with a service routing application programming interface (API) which provides an application with the ability to route traffic through a serial data (i.e., USB) or Bluetooth® (Bluetooth® is a registered trademark of Bluetooth SIG, Inc.) connection to the host computer system using standard connectivity protocols. When a user connects their mobile communication device 201 to the host computer system via a USB cable or Bluetooth® connection, traffic that was destined for the wireless network 101 is automatically routed to the mobile communication device 201 using the USB cable or Bluetooth® connection. Similarly, any traffic destined for the wireless network 101 is automatically sent over the USB cable Bluetooth® connection to the host computer system for processing.

The mobile communication device 201 also includes a battery 238 as a power source, which is typically one or more rechargeable batteries that may be charged, for example, through charging circuitry coupled to a battery interface such as the serial data port 252. The battery 238 provides electrical power to at least some of the electrical circuitry in the mobile communication device 201, and the battery interface 236 provides a mechanical and electrical connection for the battery 238. The battery interface 236 is coupled to a regulator (not shown) which provides power V+ to the circuitry of the mobile communication device 201.

The short-range communication subsystem 272 is an additional optional component which provides for communication between the mobile communication device 201 and different systems or devices, which need not necessarily be similar devices. For example, the subsystem 272 may include an infrared device and associated circuits and components, or a wireless bus protocol compliant communication mechanism such as a Bluetooth® communication module to provide for communication with similarly-enabled systems and devices.

A predetermined set of applications that control basic device operations, including data and possibly voice communication applications will normally be installed on the mobile communication device 201 during or after manufacture. Additional applications and/or upgrades to the operating system 221 or software applications 224 may also be loaded onto the mobile communication device 201 through the wireless network 101, the auxiliary I/O subsystem 250, the serial port 252, the short-range communication subsystem 272, or other suitable subsystem 274 other wireless communication interfaces. The downloaded programs or code modules may be permanently installed, for example, written into the program memory (i.e. the flash memory 244), or written into and executed from the RAM 246 for execution by the processor 240 at runtime. Such flexibility in application installation increases the functionality of the mobile communication device 201 and may provide enhanced on-device functions, communication-related functions, or both. For example, secure communication applications may enable electronic commerce functions and other such financial transactions to be performed using the mobile communication device 201.

The mobile communication device 201 may provide two principal modes of communication: a data communication mode and an optional voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by an email message application and output to the display 242. A user of the mobile communication device 201 may also compose data items, such as email messages, for example, using the touch-sensitive overlay 206 in conjunction with the display device 204 and possibly the control buttons 260 and/or the auxiliary I/O subsystems 250. These composed items may be transmitted through the communication subsystem 211 over the wireless network 101.

In the voice communication mode, the mobile communication device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., the voice communication module) and hardware (i.e., the microphone 258, the speaker 256 and input devices). Alternative voice or audio I/O subsystems, such as a voice message recording subsystem, may also be implemented on the mobile communication device 201. Although voice or audio signal output is typically accomplished primarily through the speaker 256, the display device 204 may also be used to provide an indication of the identity of a calling party, duration of a voice call, or other voice call related information.

Referring now to FIGS. 3 to 6, example mobile communication devices 201 in which embodiments of the present disclosure may be applied are illustrated. In these example embodiments, the mobile communication device 201 is a handheld mobile electronic device having two-way communication capabilities such as, for example, data communication capabilities, voice communication capabilities or the capability to communicate with other computer systems, for example, via the Internet.

In the example embodiments, the mobile device 201 includes a hard plastic main body case 70 that is configured to be held with one or two hands while the device 201 is in use. The main body case 70 may be a single piece or may include two or more portions coupled together. For example, in one embodiment, the device 201 is a "flip phone" and the main body case 70 includes two portions hinged together such that the two portions may be brought into closed contact with one another when the device 201 is not in use. The various components of the device 201 need not be located in the same portion of the main body case 70.

The case 70 may include a hook (not shown) so that it can be secured to a user's belt or pant's top, or it may be used in conjunction with a soft case (not shown) that can be mounted to the user's belt or pant's top and into which the mobile device 201 can be inserted for carrying. The mobile device 201 is, at least in some embodiments, small enough to fit inside a standard purse or suit jacket pocket.

The mobile device 201 also includes one or more input mechanisms 260. The input mechanisms 260 may take a variety of forms. For example, in some embodiments, the input mechanisms 260 may comprise any combination of a keyboard, control buttons and a navigation device such as a rotatable and depressible ("clickable") thumbwheel or scroll wheel, or a depressible ("clickable") rolling member or trackball. In some embodiments, the input mechanisms 260 are positioned towards a bottom end of the mobile device 201 for actuation by the thumbs or other fingers of the device user while it is being held in one or two hands, depending on the embodiment. In other embodiments, the input mechanisms 260 may be located elsewhere; for example control buttons may be located on a top end or any side of the device 201, and a scroll wheel may be located on a side of the device 201 for convenient thumb scrolling by the hand in which the device 201 is held. In the illustrated embodiment of FIG. 3, the input mechanism 260 has relatively few keys; however in some embodiments, such as that shown in FIG. 6, the input mechanism 260 includes a keyboard having twenty-six (26) or more alphanumeric and control keys. In some embodiments, a touch-screen display 210 acts as an input mechanism 260 for the device 210.

Figure 5:
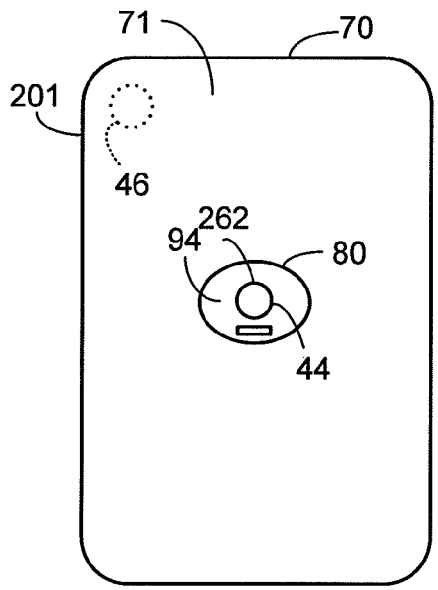
FIG. 5 shows a back view of the mobile communication device of FIG. 3.

In some embodiments, the input mechanisms 260 of the mobile device 201 may include a code reader activator button 46 for activating the code reader 262 (FIG. 2). The code reader activator button 46 need not be located on the front of the device 201; it could be in other locations, such as on the back of the device 201 as shown in FIG. 5 (in phantom).

In some embodiments, the code reader activator button 46 is a dedicated button which is assigned the function of activating the code reader 262. In other embodiments, the mobile device 201 may provide a graphical user interface (GUI) on the display screen 204 for controlling the operation of the device 201. The GUI, together with the input mechanisms 260, may permit a user to activate the code reader 262 and code reader application 228. As with typical GUIs, the device user may cause a menu to be displayed on the display screen 204 having a number of menu item items which can be selected. One of those items may be an "scan barcode" or similar item, which, when selected, causes the code reader 262 to enter a barcode scanning mode, as described above. In the barcode scanning mode, the code reader application 228 analyzes the image obtained through the electronic image sensor of the code reader 262 in an attempt to recognize/detect a barcode. If a barcode is detected (for example, by identifying/detecting the border indicia of a Data Matrix code or by identifying/detecting the position symbols of a QR code), the code reader application 228 decodes the barcode and obtains the contact information encoded therein.

Figure 3:
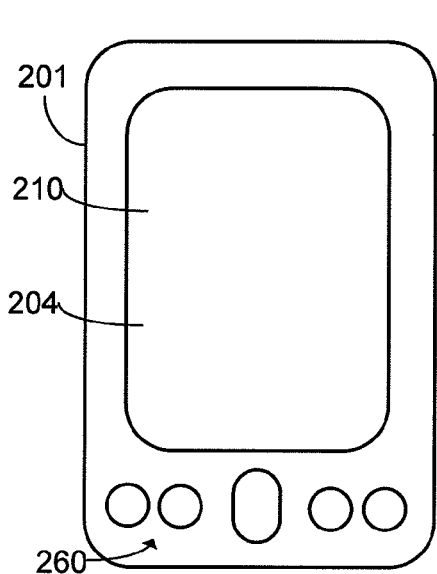
FIG. 3 shows a front view of an example embodiment of the mobile communication device of FIG. 2.
Figure 4:
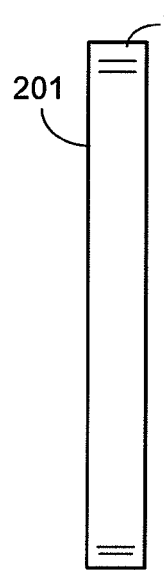
FIG. 4 shows a side view of the mobile communication device of FIG. 3.
Figure 6:
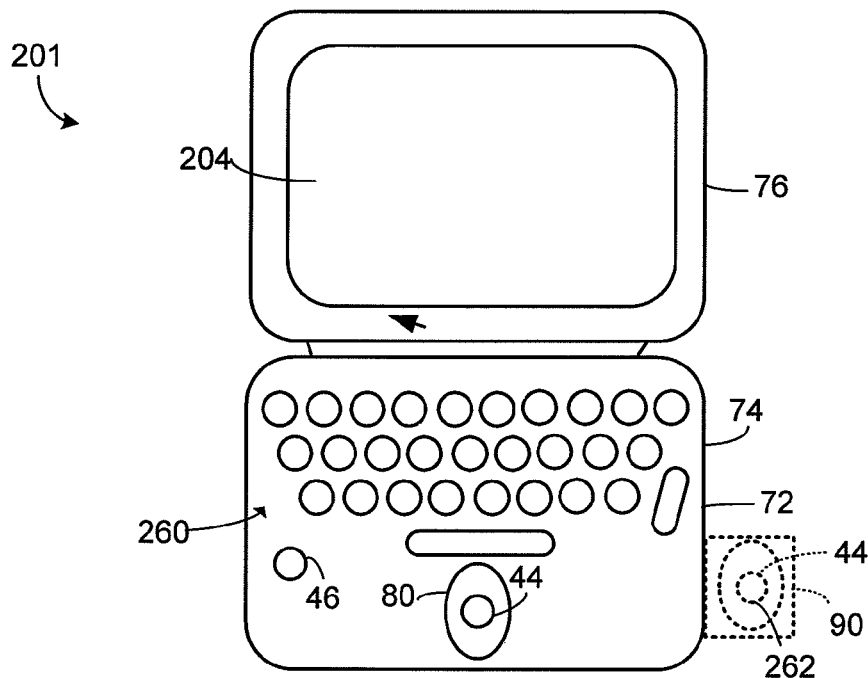
FIG. 6 shows a front view of a second example embodiment of the mobile communication device of FIG. 2.

In some embodiments, such as the embodiment of FIGS. 3 to 6, the code reader 262 is a digital camera 44. In the embodiment of FIG. 3, the case 70 includes a substantially planar back wall 71, which has an opening 80 provided therethrough. A transparent lens 94 covers the opening 80, behind which the camera 44 is located. As is known in the art, the digital camera 44 includes one or more electronic image sensors for capturing an image or video In various embodiments, the camera 44 may be located in various locations on the device 201. Similarly, the handheld device 201 may have configurations different than the configuration in the example embodiment described above. For example, the camera 44 may be located facing outward from the front of the device 201. By way of non-limiting example, FIG. 6 shows a front view of a handheld device 11 according to one embodiment of the invention. The device 201 of FIG. 6 is similar to the device of FIGS. 3 to 5; however the input mechanisms 260 of the device 201 of FIG. 6 include a thumb-activated QWERTY keyboard next to which the camera 44 is located, and the main body or case 72 of the device 201 includes first and second portions 74, 76 that are pivotally mounted together. Second case portion 76 houses the display 204, and the first case portion 74 houses the keyboard, which is configured for thumb typing. In the hand-held device 201 of FIG. 6, the camera 44 is provided through opening 80 on the front of the first case portion 104. The camera 44 faces the same direction as the keyboard 32 for capturing images of the user while operating the device.

In some embodiments, the camera 44 is pivotally mounted to the case of the handheld device 201 such that it can be rotated to face in a direction desired by the user. By way of example, a pivotally mounted camera unit 90 is shown in phantom in FIG. 4. The camera unit 90 may be detachable from the case 72.

Figure 7:
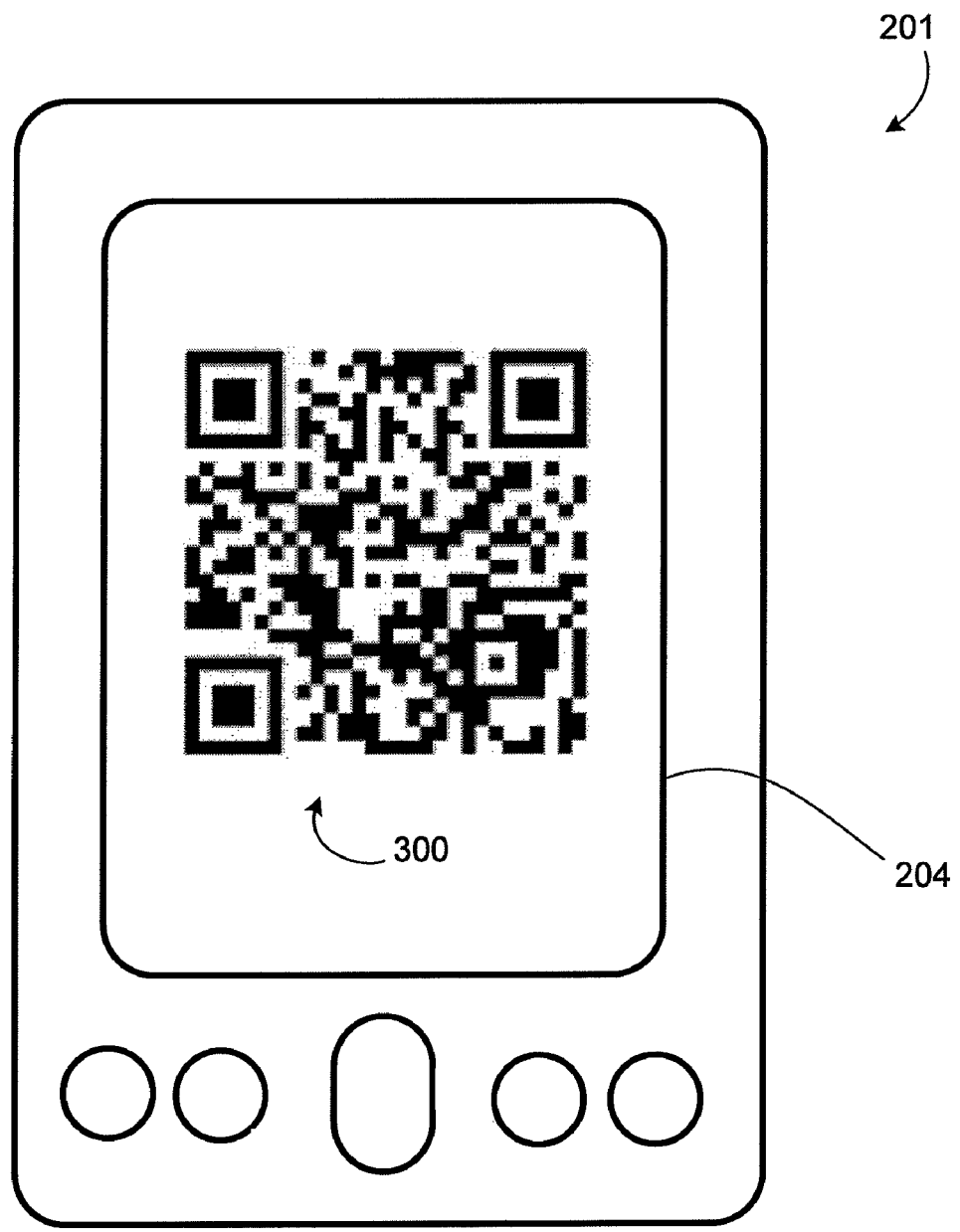
FIG. 7 shows a front view of an example embodiment of the mobile communication device displaying a barcode.

Reference is now made to FIG. 7, which shows the mobile communications device 201 displaying an example barcode 300 on the display 204. The barcode 300 in this example is a QR code. The example QR code shown in FIG. 7 encodes the text "Research In Motion Limited".

Figure 8:
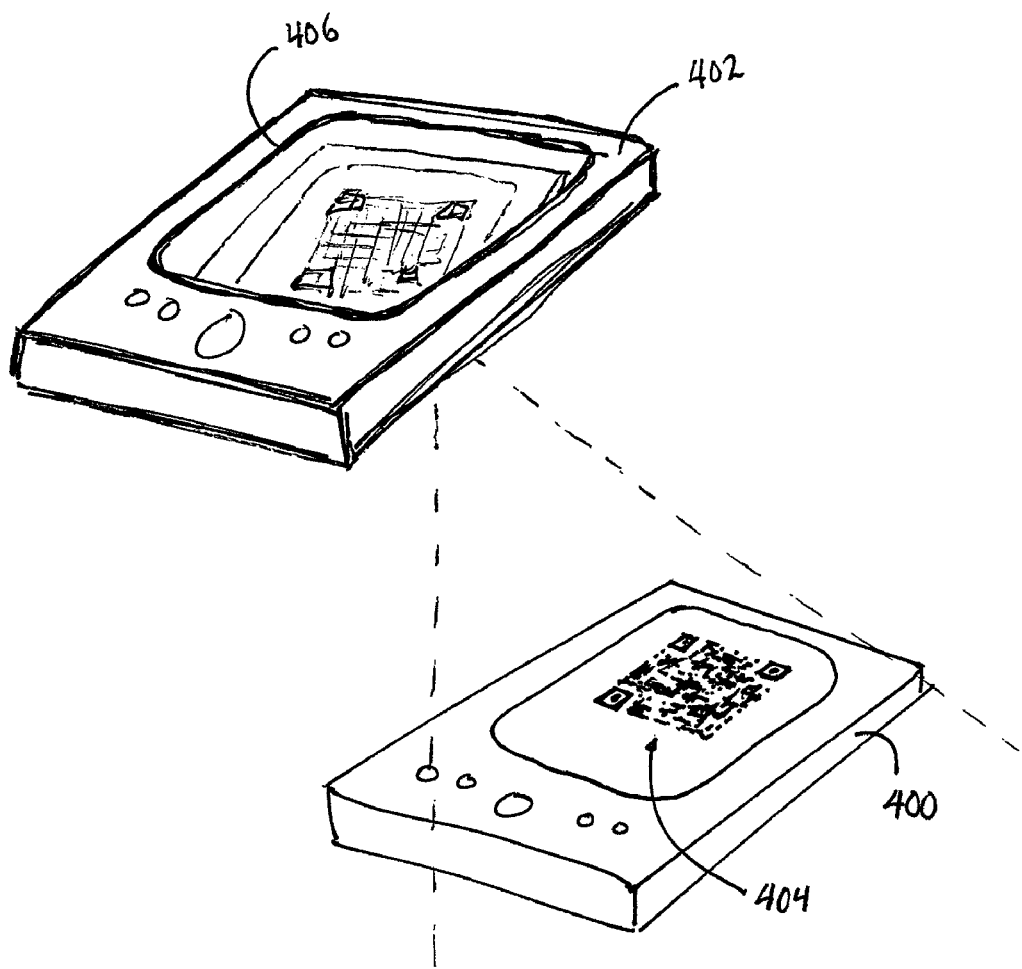
FIG. 8 diagrammatically illustrates a handheld device scanning a barcode displayed by another handheld device.

Reference is now made to FIG. 8, which shows, in diagrammatic form, an exchange of contact information between mobile devices. The exchange involves a first mobile device 400 and a second mobile device 402. The first mobile device 400 is associated with a first user and the second mobile device 402 is associated with a second user. The first user and second user, when in close proximity to each other, agree to exchange contact information. Accordingly, the first user causes the first mobile device 400 to display a barcode 404.

The barcode 404 is generated by a barcode generating module operating on the first user device 400. In response to selection of an icon or menu item by the first user, the barcode generating module retrieves contact information for the first user from memory on the first mobile device 400 and encodes at least some of the contact information within the barcode 404. It then displays the barcode 404 as shown in FIG. 8.

The second user selects an icon or menu item on the second mobile device 402 to cause the second mobile device 402 (and in particular the code reader 262 and code reader application 228 on the second mobile device 402) to enter the barcode scanning mode. The second mobile device 402 may enter the barcode scanning mode by, for example, an explicit command from the user to enter barcode scanning mode. The second mobile device 402 may also enter the barcode scanning mode by activating the viewfinder mode and automatically recognizing a barcode present in the field of view. While in the barcode scanning mode, the second mobile device 400 displays the image received by the electronic image sensor of the code reader 262 (e.g. camera) on the display 406, in similar manner to the viewfinder mode of a camera application. The second user may then visually verify, based on the image seen on the display, whether the barcode 404 on the first mobile device 400 is clearly visible in the field of view of the code reader 262. The code reader application 228 analyzes the images received by the code reader 262 and when it recognizes the barcode 404 within the received image, it obtains an image of the barcode from the code reader 262 and decodes it to obtain the first user's contact information.

Figure 9:
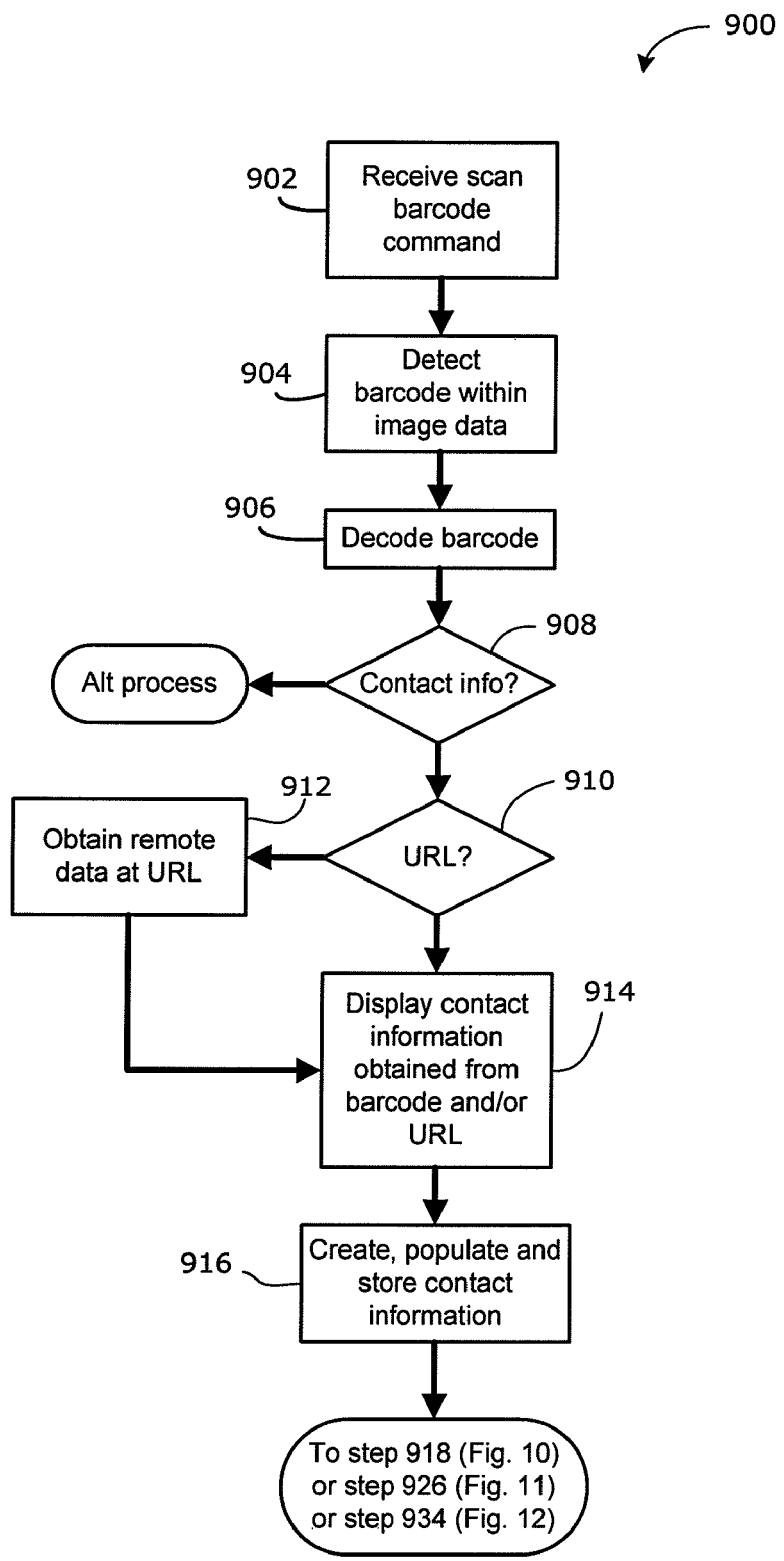
FIG. 9 shows a flowchart illustrating a process for obtaining contact information from a barcode in accordance with an example embodiment of the present disclosure.

Reference will now be made to FIG. 9 which illustrates a process 900 for obtaining and transmitting contact information in accordance with one embodiment of the present application. The process may be performed by a mobile device 201, and more specifically, by the controller 240 and/or code reader application 228 associated with the mobile device 201.

In the description which follows, the term "the user" refers to the user of a mobile device 201 having the code reader application 228 installed thereon and the term "the contact" refers to an individual associated with the contact information which is included in a barcode.

The process 900 is initiated by the contact displaying a barcode to the user. The contact may display the barcode on his or her own mobile device or the barcode may be in printed form, perhaps on a business card. The barcode encodes contact information for the contact.

Due to the short-range nature of barcode scanning, the user is able to visually verify the person from whom they are receiving contact information. In this way, the contact information exchange system provides for a similar level of contact authentication as with the traditional exchange of conventional paper business cards.

The user inputs a request to his or her mobile device 201 instructing the device 201 to scan for a barcode. As noted in FIG. 9, at step 902 the device 201 receives a scan barcode command. As indicated previously, the scan barcode command may be received via a menu selection, a dedicated code reader activator button 46, a preset key combination, or other input mechanism. The command may represent an explicit request from the user to scan for a barcode, or the command may be a request that the device enter a viewfinder mode and the device may automatically scan for barcodes whilst in this mode.

At step 904, in response to receiving a request to obtain the code, the mobile device 201, and in particular the code reader application 228, analyzes the image data obtained by the code reader 262 in an attempt to detect a barcode. As described above, the analysis may be conducted with the code reader 262 in barcode scanning mode, in which the code reader 262 continually scans its field of view and the code reader application 228 analyzes the image data received through the electronic image sensor of the code reader 262. In some embodiments, it may be conducted after the code reader 262 has been manually actuated by the user to capture an image, and the analysis is applied to the captured image. Irrespective of how the analysis is performed, and at what point the analysis is performed, the code reader application 228 detects a barcode within the image data in step 904.

Next, at step 906, having detected the barcode within the image data, the mobile device 201 decodes the barcode to obtain the contact information stored therein. The decoding process extracts information encoded in the barcode, such as, for example, contact information. The decoding process may include performing error checking and correction; for example, using Reed Solomon error correction.

At step 908, the mobile device 201 determines whether the decoded information includes contact information. In some cases, the device 201 may be used to scan barcodes for other purposes. For example, barcodes printed in an advertisement or newspaper may be used to link to a website or other remote location. Many other uses are possible. In step 908, the mobile device 201 determines whether the decoded information is contact information; for example, whether it contains business card information. There are many possible mechanisms for determining whether the information encoded in the barcode is contact information. For example, a designated flag or other indicator may be specified to indicate that the information is contact information. In another embodiment, the device 201 may parse the decoded information and look for indicator of contact information, such as a name, telephone number and email address, or other contact-specific fields. In yet another embodiment, the contact information decoded from the barcode may contain a URL that points the device 201 to a remote location, and the URL and/or the remote location may indicate that the data obtained from the remote location is contact information in accordance with the present application. Other possibilities will be apparent to those ordinarily skilled in the art.

If the information obtained from decoding the barcode is not contact information, then step 908 may lead to an alternative process.

If the decoded information is contact information, then in step 910 the device 201 determines whether the contact information includes a URL or other remote address from which the device 201 can obtain further contact information. If so, then in step 912 it obtains further contact information, e.g. remote data, from the URL or other remote address. It will be understood that in some embodiments the determination in step 908 may occur after steps 910 or 912 if the data from the remote location is necessary to determine whether the barcode relates to contact information.

In some embodiments, the device 201 may then perform step 914, wherein the contact information obtained from the barcode, or the URL/remote address, or both, are displayed on the screen of the device 201. Step 914 may include formatting the contact information in accordance with a predefined contact information layout scheme. In some cases, a stylesheet or other layout information may be encoded in the barcode or obtained from the URL/remote address. In at least one embodiment, the stylesheet or layout scheme is configured to cause the device 201 to display the contact information in a manner that mimics the style and layout of a printed business card.

In some embodiments, the device 201 may also or alternative perform step 916, wherein contact information obtained from the barcode, or the URL/remote address, or both, is saved on the device 201, for example as contact information 242 stored in memory on the device 201. The device 201, and in particular the contact application 226 or code reader application 228, may be configured to confirm the contact information is new, i.e. not already present in the contact information 242 in memory, generate a new contact entry, populate the fields of the new contact entry with the contact information, and save the populated new contact entry in memory as contact information 242. In some embodiments, the mobile device 201 may categorize portions of the contact information by parsing the contact information for predefined keywords; such as, for example, "address" or "email" or "phone". Alternatively, in some embodiments, the information contained in the barcode may be formatted according to a predefined format for storing contact information. The user may be prompted to provide confirmation that the new entry is to be saved and may be given an opportunity to edit the populated new contact entry before it is saved.

It will be appreciated that in some embodiments steps 914 and 916 may be optional.

Figure 10:
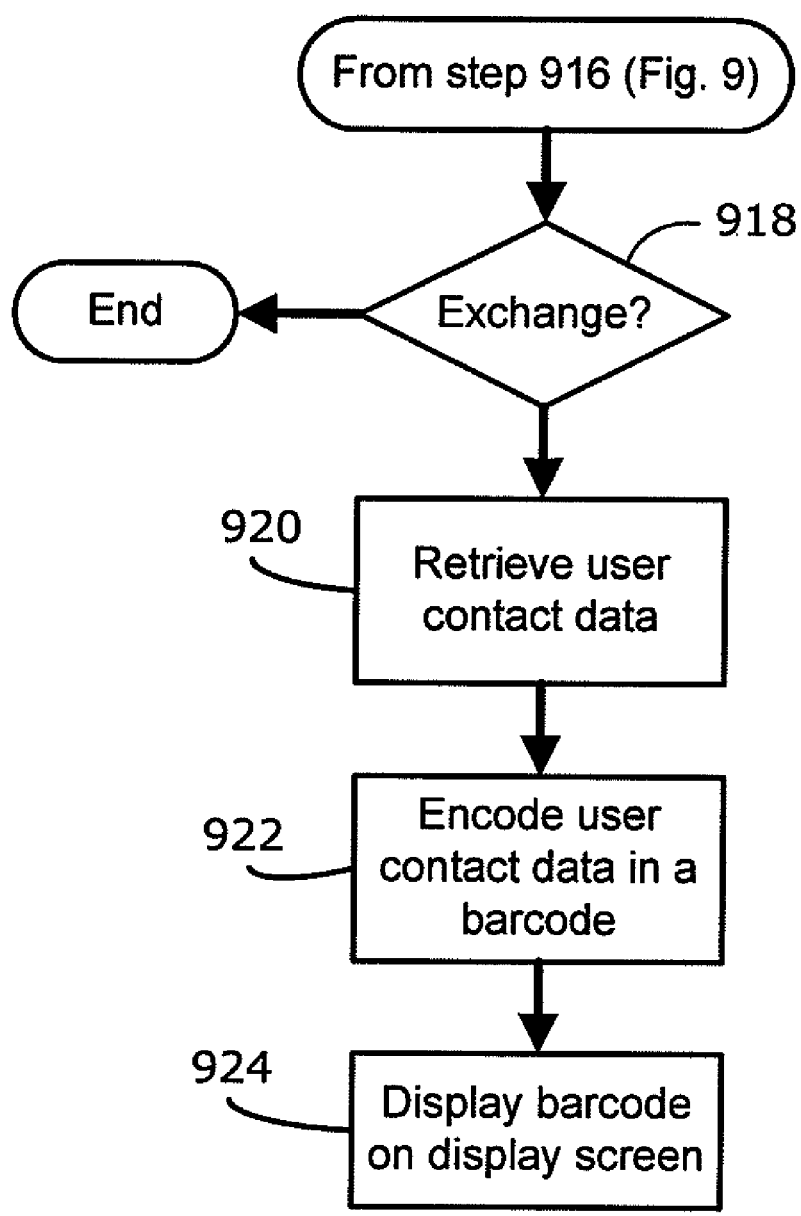
FIG. 10 shows an example portion of the process of FIG. 9 in which the user device reciprocates by displaying user contact data in barcode form.
Figure 11:
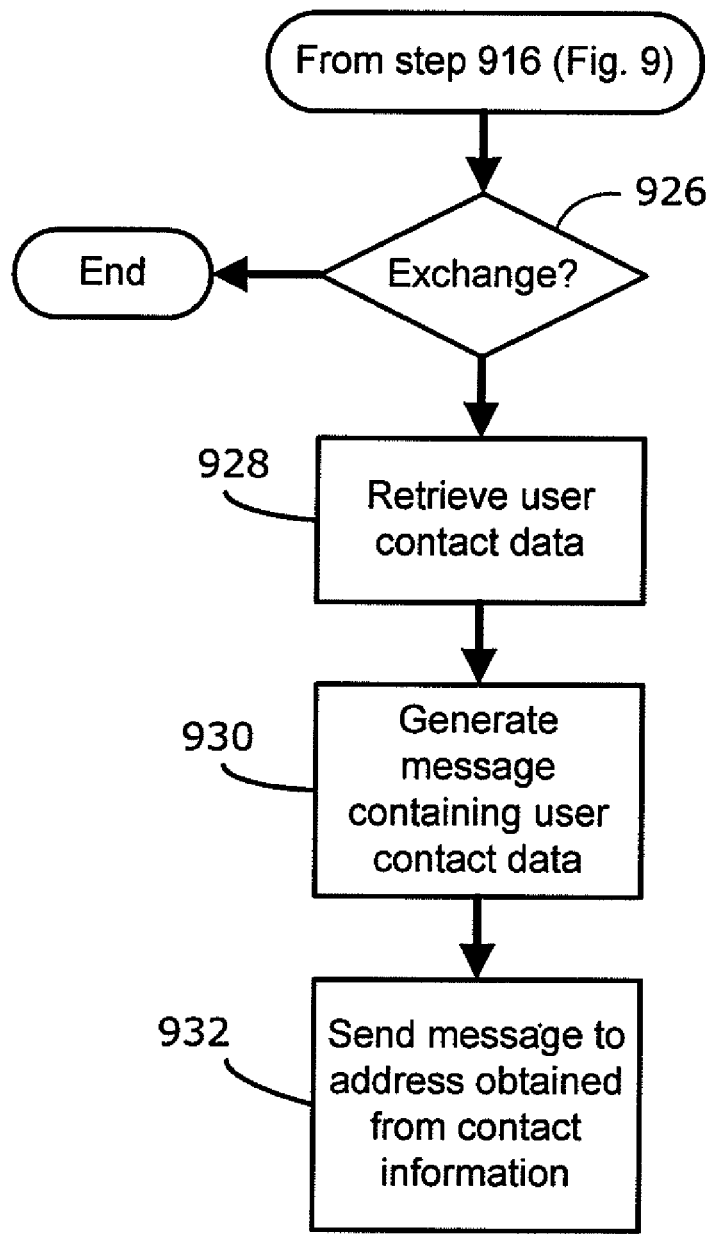
FIG. 11 shows another example portion of the process of FIG. 9 in which the user device reciprocates by transmitting user contact data to an electronic address in a message.
Figure 12:
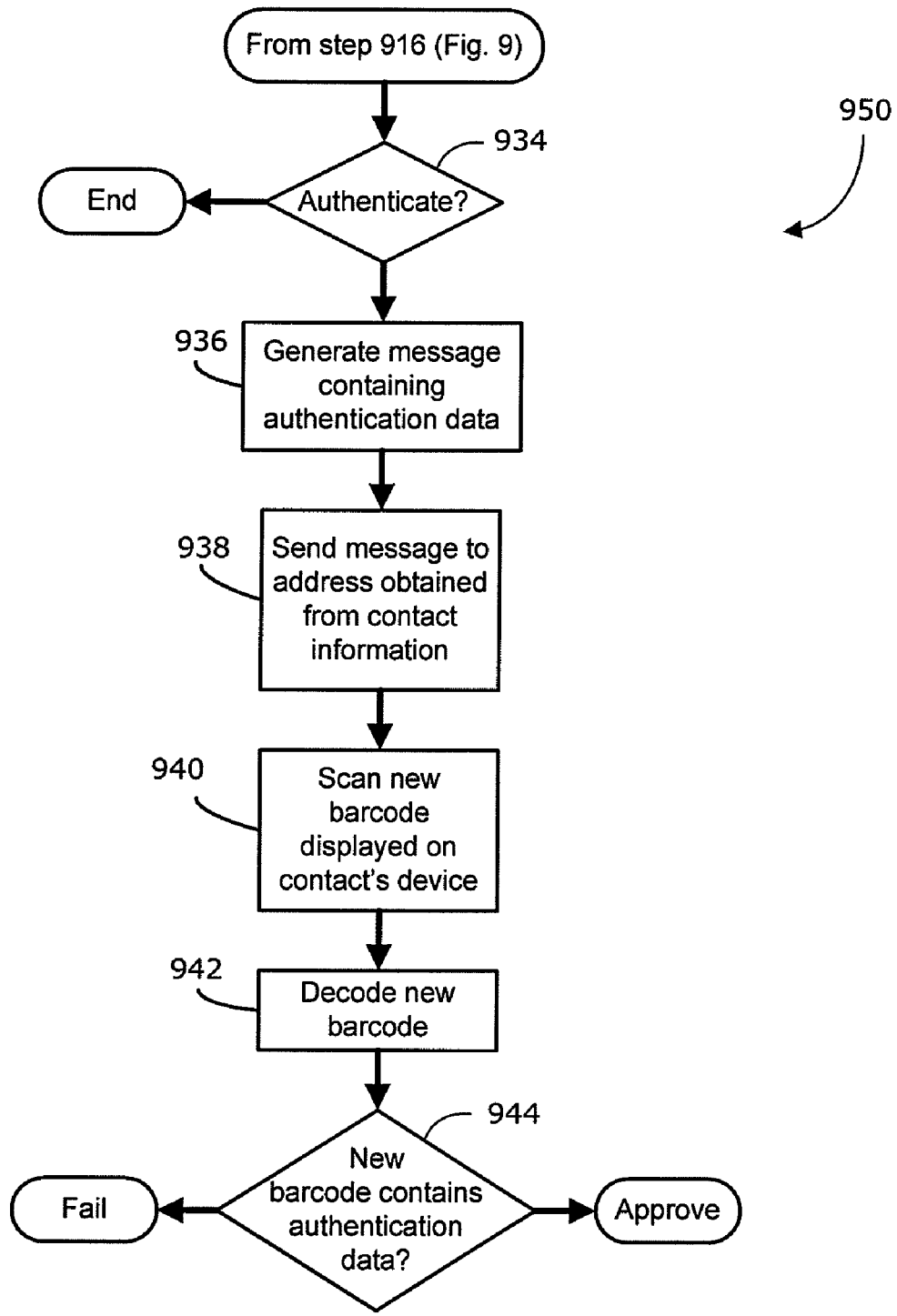
FIG. 12 shows a further example portion of the process of FIG. 9 in which the user device authenticates a contact's device.

Reference will now be made to FIGS. 10, 11, and 12, which shows further example steps in the process 900 after the contact information has been obtained, i.e. after steps 910, 912, 914, or 916. Example devices 201 may include a code reader application or other program modules that implement one or more of the example steps of the process 900. In one example, a device 201 may provide the user with the option of selecting one or more of the examples of the process 900 in a particular instance.

Referring first to FIG. 10, a portion of the process 900 is illustrated in which the user and the contact mutually exchange contact details using barcodes. In step 918, the device 201 determines whether to exchange contact data with the individual from whom the contact information was obtained. In other words, the device 201 determines whether it will reciprocate by providing the contact with the contact data associated with the user of the device 201. This determination may be based on a preset option set by the user. For example, the device 201 may be configured to automatically reciprocate and provide a contact with the user's contact data. In this context "automatically" means that the device 201 carries out the steps without further command or instruction from the user of the device 201. In another embodiment, the determination may be based on input received from the user of the device 201 in response to a prompt. For example, the device 201 may query, via the GUI display, whether the user wishes to exchange contact information. The user may be given the option of accepting an exchange or rejecting it. In yet another embodiment, the determination may be based on the contact information received from the barcode. The contact information may contain a preference that indicates whether the contact wishes to automatically receive reciprocal contact data from the user of the device 201.

If an exchange is to occur, then in step 920 the device 201 retrieves the user's contact data 241, for example from memory. In step 922 it encodes the user's contact data 241 in a barcode. The barcode may be a 1D or 2D barcode, such as a QR code or a Data Matrix code. The term "barcode" is understood in this context to include any image encoding the user contact data 241. The barcode is then displayed on the display screen 204 of the device 201 in step 924. Once the barcode is displayed on the device 201, then user may present the display screen 204 of the device 201 to the contact, who may then use his or her own mobile device to scan and decode the displayed barcode, thereby obtaining the user's contact data 241.

It will be understood that in some embodiments the user's contact data 241 may be located remotely accessible via a URL or remote address, and that steps 920 and 922 include retrieving the URL or remote address and encoding the URL or remote address as the barcode.

It will also be understood that in some embodiments, steps 920 and 922 may be pre-performed; that is, performed prior to receiving any contact information in the process 900 and the encoded user contact data 241 may be stored as a barcode in memory on the device 201. In this embodiment, step 922 includes retrieving the stored barcode from memory.

Referring now to FIG. 11, an alternative portion of the process 900 is illustrated in which the user and the contact mutually exchange contact details, but the user sends his or her contact data in a message. In step 926, the device 201 determines whether to exchange contact data with the individual from whom the contact information was obtained. In other words, the device 201 determines whether it will reciprocate by providing the contact with the contact data associated with the user of the device 201. This determination may be based on a preset option set by the user. For example, the device 201 may be configured to automatically reciprocate and provide a contact with the user's contact data. As noted above, "automatically" means that the device 201 carries out the steps without further command or instruction from the user of the device 201. In another embodiment, the determination may be based on input received from the user of the device 201 in response to a prompt. For example, the device 201 may query, via the GUI display, whether the user wishes to exchange contact information. The user may be given the option of accepting and exchange or rejecting it. In yet another embodiment, the determination may be based on the contact information received from the barcode. The contact information may contain a preference that indicates whether the contact wishes to automatically receive reciprocal contact data from the user of the device 201.

If an exchange is to occur, then in step 928 the device 201 retrieves the user's contact data 241, for example from memory. In step 930, the device 201 generates a message containing the user's contact data 241. The message may, in some embodiments, be an email message. The message may, in some embodiments, be an SMS, MMS, IM, or other data message. The message may be configured to be sent over a WWAN, WLAN or other type of network in some embodiments. In some embodiments, the message may be configured to be sent directly from the mobile device to the contact's mobile device, for example by a short-range connection, such as a Bluetooth™ connection. The form and type of the message may be based on a preference specified by the contact information obtained from the contact. It will be appreciated that the message may "attach" the contact information, in the sense that it may be sent as an attachment to, for example, an email message. The attachment may be a file or other item, such as a vCard. In this context, it will be understood that a message "containing" the user's contact data includes placing the contact data in the body of the message or attaching it as a separate file or item to the message.

The contact information obtained from the contact includes at least one electronic address associated with the contact. For example, it may contain a telephone number, an email address, a SIP URL or any other destination identifier associated with the individual. As described above, in some embodiments, the contact information that the mobile device 201 obtains from decoding the barcode includes a URL or other remote address from which addition contact information is obtained. The additional contact information obtained from the URL or other remote address may provide the at least one electronic address associated with the contact. The "at least one electronic address" may be understood to have been obtained from the contact information, even if it was obtained indirectly by accessing a URL specified in the contact information.

The message generated in step 930 is addressed to the "at least one electronic address". In step 932 it is sent to the at least one electronic address. As noted above the transmission of the message may be over various types of networks using various transmission protocols depending on the specific embodiment. In will be appreciated that the "electronic address" in this respect is understood to be a destination address associated with the contact to which the device can transmit an electronic message.

In this manner the device 201 reciprocates by sending the user's contact data 241 to the contact by way of a message transmitted by the mobile device 201 to an electronic address obtained from the contact information. In some embodiments, the electronic address is associated with a mobile handheld device in possession of the contact, thereby allowing the contact to verify receipt of the reciprocal contact data; however, the electronic address is not necessarily associated with such a device.

Reference will now be made to FIG. 12, which shows an example portion of the process 900 used for the purpose of authenticating the individual contact and the address of his or her device. This authentication process (generally indicated 950) begins after receipt of the contact information, and starts with determining whether authentication is to be performed (step 934). This determination may be based on a flag or other indicator preset by the user or an administrator. The determination may be based on user response to a query as to whether the user desires authentication of the contact individual's device.

The contact information obtained from the individual contact includes an electronic address for the individual contact's mobile device. As noted above, this electronic address may be obtained from the contact information indirectly if the contact information provides a URL from which the device 201 receives the electronic address.

The device 201 has stored thereon, in volatile or non-volatile memory, authentication data. The authentication data may be pre-established at device manufacture, at provisioning of the device, or at any point thereafter, or may be generated as unique data for each authentication. The authentication data is unique data, such as for example a numeric, alphanumeric, or binary string, that the device 201 may use to authenticate the contact's mobile device using this process 950.

In step 936 the device 201 generates a message containing the authentication data. As described in connection with FIG. 11, the message may be an email message, SMS, MMS, IM, or other data message. The message is addressed to the electronic address obtained from the contact information. It will be appreciated that if the electronic address is an email address, then the message may be an email message. If the electronic address is a telephone number, then the message may be an SMS or MMS.

In step 938 the message is sent to the electronic address. At the contact's mobile device, presuming the electronic address is correctly associated with the mobile device, the message is received and the contact's mobile device is configured to extract the authentication data. Moreover, the contact's mobile device is configured to generate a new barcode, wherein the new barcode encodes the authentication data. The contact's mobile device then displays the new barcode.

In step 940, the user positions his or her mobile device 201 to scan the displayed new barcode on the contact's mobile device. In step 942, the mobile device 201 decodes the scanned new barcode, and in step 944 the mobile device 201 determines whether it has recovered the authentication data from the new barcode. In particular, it compares the original authentication data stored on the mobile device 201 which was used to generate the message in step 936 with the data decoded from the new barcode. If the data decoded from the new barcode matches the authentication data, then the contact's mobile device and its electronic address may be considered approved and/or authenticated. Any number of steps or operations may be taken as a result of the authentication, including saving the contact details, or reciprocating by sending the user's contact data as shown in FIG. 10 or 11. If the data decoded from the new barcode does not match the authentication data, then the authentication has failed and the mobile device 201 may alert the user of the failure.

While the processes 900, 950 have been described as steps occurring in a particular sequence, it will be appreciated by persons skilled in the art that some of the steps may be performed in a different order provided that the result of the changed order of any given step will not prevent or impair the occurrence of subsequent steps. Furthermore, some of the steps described above may be combined in other embodiments, and some of the steps described above may be separated into a number of sub-steps in other embodiments.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two, or in any other manner. Moreover, the present disclosure is also directed to a pre-recorded storage device or other similar computer readable medium including program instructions recorded thereon for performing the methods described herein. For example, the present disclosure is also directed at a computer readable medium having encoded thereon instructions for executing any one or a combination of the processes 900, 950 of FIG. 9, 10, 11 or 12.

Certain adaptations and modifications of the described embodiments can be made. Therefore, the above discussed embodiments are considered to be illustrative and not restrictive.

What is claimed is:

1. A method of exchanging contact information using an electronic handheld device, the electronic handheld device having a camera and a memory storing user contact data, the method comprising:

obtaining, with the camera, an image of a first barcode associated with a contact, the first barcode having contact information encoded therein;

decoding the first barcode to obtain the contact information;

obtaining an electronic address associated with the contact from the contact information;

authenticating the electronic address by
transmitting authentication data to the electronic address,
obtaining, with the camera, an image of a second barcode displayed by a handheld mobile device associated with the electronic address, decoding the second barcode to obtain decoded information, and verifying that the decoded information matches the authentication data; and automatically transmitting the user contact data to the electronic address obtained from the contact information.

2. The method of claim 1, wherein the electronic address is an email address.

3. The method of claim 1, wherein the first barcode and second barcode comprise two-dimensional barcodes.

4. The method of claim 1, wherein obtaining the image includes detecting the first barcode within the image.

5. The method of claim 1, wherein obtaining the image includes operating the camera in a viewfinder mode, analyzing image data from the camera, detecting the first barcode within the image data and, in response to detecting the first barcode, capturing the image.

6. The method of claim 1, wherein the user contact data includes an address associated with the electronic handheld device.

7. The method of claim 1, wherein the contact information includes a URL, wherein obtaining the electronic address associated with the contact includes obtaining additional contact information from the URL, and wherein the additional contact information includes the electronic address associated with the contact.

8. An electronic device comprising:
a display screen;
a camera;
memory storing user contact data;
a processor; and
a code reader application executable by the processor and containing instructions for configuring the camera to obtain an image of a first barcode associated with a contact, the first barcode having contact information encoded therein, and instructions to configure the processor to decode the first barcode to obtain the contact information, obtain an electronic address associated with the contact from the contact information, authenticate the electronic address, and automatically transmit the user contact data to the authenticated electronic address obtained from the contact information,
wherein the electronic address is authenticated by
transmitting authentication data to the electronic address,
obtaining, with the camera, an image of a second barcode displayed by a handheld mobile device associated with the electronic address,
decoding the second barcode to obtain decoded information, and
verifying that the decoded information matches the authentication data.

9. The electronic device of claim 8, wherein the electronic address is an email address.

10. The electronic device of claim 8, wherein the first and second barcodes comprise two-dimensional barcodes.

11. The electronic device of claim 8, wherein the instructions for configuring the camera to obtain the image includes instructions for configuring the processor to detect the first barcode within the image.

12. The electronic device of claim 8, wherein the instructions for configuring the camera to obtain the image includes instructions for configuring the processor to operate the camera in a viewfinder mode, analyze image data from the camera, detect the first barcode within the image data and, in response to detecting the first barcode, capture the image.

13. The electronic device of claim 8, wherein the user contact data includes an address associated with the electronic device.

14. The electronic device of claim 8, wherein the contact information includes a URL, wherein the instructions for configuring the processor to obtain the electronic address associated with the contact includes the instructions for configuring the processor to obtain additional contact information from the URL, and wherein the additional contact information includes the electronic address associated with the contact.

15. The electronic device of claim 8, wherein the electronic device comprises a mobile handheld device.

16. A computer readable program product comprising a computer readable storage medium having encoded thereon computer executable instructions for exchanging contact information using an electronic handheld device, the electronic handheld device having a camera, a display screen, and a memory storing user contact data, the computer executable instructions comprising:
instructions for obtaining, with the camera, an image of a first barcode associated with a contact, the first barcode having contact information encoded therein;
instructions for decoding the first barcode to obtain the contact information;
instructions for obtaining an electronic address associated with the contact from the contact information;
instructions for authenticating the electronic address by
transmitting authentication data to the electronic address,
obtaining, with the camera, an image of a second barcode displayed by a handheld mobile device associated with the electronic address,
decoding the second barcode to obtain decoded information, and
verifying that the decoded information matches the authentication data; and
instructions for automatically transmitting the user contact data to the electronic address obtained from the contact information.

17. The method of claim 2, wherein automatically transmitting includes generating an email message addressed to the email address and sending the email message, and wherein the email message contains the user contact data.

18. The electronic device of claim 9, wherein the code reader application includes instructions for configuring the processor to generate an email message addressed to the email address and send the email message, and wherein the email message contains the user contact data.

* * * * *